United States Patent
Kotlarski

Patent Number: 6,158,078
Date of Patent: Dec. 12, 2000

[54] WIPER FOR MOTOR VEHICLE WINDSHIELDS

[75] Inventor: Thomas Kotlarski, Buehlertal, Germany

[73] Assignee: Robert Bosch GmbH, Stuttgart, Germany

[21] Appl. No.: 09/242,868

[22] PCT Filed: Jun. 18, 1998

[86] PCT No.: PCT/DE98/01677

§ 371 Date: Feb. 25, 1999

§ 102(e) Date: Feb. 25, 1999

[87] PCT Pub. No.: WO99/02382

PCT Pub. Date: Jan. 21, 1999

[30] Foreign Application Priority Data

Jul. 11, 1997 [DE] Germany .......................... 197 29 865

[51] Int. Cl.[7] .................................. B60S 1/40; B60S 1/38
[52] U.S. Cl. ..................................... 15/250.32; 15/250.43
[58] Field of Search .......................... 15/250.32, 250.43, 15/250.44, 250.451, 250.452, 250.453, 250.454, 250.361

[56] References Cited

U.S. PATENT DOCUMENTS 3,147,506  9/1964  Williams .
3,845,519  11/1974  Quinlan et al. .
4,318,200  3/1982  Bauer et al. .
4,343,064  8/1982  Van Den Berg et al. .
5,065,474  11/1991  Charng .

FOREIGN PATENT DOCUMENTS 1 028 896  10/1958  Germany .
1 505 397  10/1969  Germany .
  2404004  7/1975  Germany .......................... 15/250.32
  2847978  5/1980  Germany .

*Primary Examiner*—Gary K. Graham
*Attorney, Agent, or Firm*—Michael J. Striker

[57] ABSTRACT

A wiping device is proposed, which is used to clean windshields of motor vehicles. The wiping device has a driven wiper arm (12) to whose free end a wiper blade (14) is pivotably connected that is provided with an elongated, rubber-elastic wiper strip (32) and that can be placed against the window (20); the extending at least approximately in the wiping direction (24) of the wiper blade, the wiper strip is held, parallel to the longitudinal axis, on a striplike, elongated, spring-elastic support element (26), on whose middle portion one half (28) of a connection device (16) for the wiper arm (12) provided with the other device half (30) is contained. A wiping device of particularly low height is obtained if the wiper blade (14) is disposed next to the wart (12), viewed vertically to the window (20), and is pivotably connected to the wiper arm via the connection device (16).

10 Claims, 3 Drawing Sheets

WIPER FOR MOTOR VEHICLE WINDSHIELDS

BACKGROUND OF THE INVENTION

The support bracket frame wiper blades (German Patent 15 05 397), which have been widely used for a long time in wiping devices for motor vehicle windshields, have a great structural height, which under the flow conditions existing in front of the vehicle window, especially at a high vehicle speed, promotes the tendency of the wiper blade to lift away from the window. At the very least, this reduces the prescribed contact pressure of the wiper blade on the window so greatly that the wiping quality suffers.

In a known wiper blade (German Patent 10 28 896) that is part of a wiping device, the support element for the entire field swept by the wiper blade is intended to assure the most uniform possible distribution of the wiper blade contact pressure against the window that originates at the wiper arm. By a suitable curvature of the unstressed support element— that is, when the wiper blade is not contacting the window— the ends of the wiper strip, pressed completely onto the window during wiper blade operation, are stressed by the then-stressed support element toward the window, even if the radii of curvature of spherically curved vehicle windows change for every wiper blade position. The curvature of the wiper blade must accordingly be somewhat greater than the greatest curvature measured in the field to be wiped in the window in question. Thus the support element replaces the complicated support bracket construction with two spring rails, disposed in the wiper strip, of the kind used in the conventional wiper blades discussed above. Although this does allow reducing the structural height of the wiper blade, nevertheless the attainable improvement in wiping quality at high vehicle speeds still does not meet the stringent demands made in this respect by some customers. The wiper arm, located above the wiper blade, has proved to be advantageous because it lessens the advantages of the low-height wiper blade.

SUMMARY OF THE INVENTION

In accordance with the present invention, a wiper blade is disposed next to a wiper arm, viewed vertically to the window and is pivotably connected to the wiper arm via the connection device, and a pivot pin is disposed on the wiper blade, while its bearing receptacle is located on the wiper arm.

In the wiping device of the invention the wiper arm belonging to the wiping device is located next to the wiper blade, so that the wiper arm can have hardly any further influence on the structural height of the wiping device and thus on the high-speed performance of the wiper blade in operation. The pivotable connection allows proper contact of the wiper blade or wiper strip with the surface of the window in every wiper blade position, even at extremely high vehicle speeds.

The pivotable connection between the wiper arm and the wiper blade is attained in a simple, operationally safe and reliable way by providing that one of the two device halves has a pivot pin, and the other of the two device halves is provided with a bearing receptacle associated with the pivot pin.

Since the pivot pin is disposed on the wiper blade, and its bearing receptacle is located on the wiper arm, the device half, which as a rule can be made more economically, is then disposed on the wiper blade, which can be considered a wearing part. Without regard to this, however, it may also be advantageous for special reasons to dispose the pivot pin on the wiper arm and the bearing receptacle on the wiper blade.

So that the connection between the wiper arm and the wiper blade cannot be undone, especially during wiper operation in the direction of the pivot axis of the pivotable connection, the two device halves are provided with means for axially securing the pivot pin in its bearing receptacle. The inside faces of the legs of the U, facing toward one another, and the side faces of the respective device halves facing one another also form excellent guide means, which given careful dimensional adaptation assure quiet operation of the wiping device.

A stable, compact design of the device half having the pivot pin is obtained in that this half has a base body, on each of the two sides of which, remote from which and located crosswise to the wiping direction, a respective projection protruding in the wiping direction is disposed, and the two projections have a longitudinal axis aligned with one another. The two projections in a sense form the free ends of a pivot pin integrated with the base body, whose middle portion located in the base body has no pivoting function.

A wiping device of especially low height is obtained if the device half that has the bearing receptacle has a U-shaped cross section, the two legs of the U fitting over the two sides of the base body that are provided with the projections, and one bearing receptacle is disposed in each of the two legs for the projection disposed on the side of the base body fitting over it. The legs of the U of this device half in cooperation with the sides, facing them and provided with the projection, of the base body of the other device half then form a simple, operationally safe and reliable means of securing the wiper blade, pivotably connected to the wiper arm, in the wiping direction.

To connect the device half having the bearing receptacle to the wiper arm, the leg of the U is provided with a mount for the free end of the wiper arm.

Expediently, the mount has an insertion channel for the free end of the wiper arm and is provided for securing means for the end of the wiper arm in the insertion channel. These securing means may for instance be embodied as a detent connection or a clamp connection. However, it is also conceivable for the end of the wiper arm to be glued, welded or secured in some other way in the insertion channel. For instance, one device half can also be formed directly onto the free end of the wiper arm, if this half—in accordance with a further characteristic of the invention—is made of plastic.

A simple, economical embodiment of the invention that suits the need of the industry is obtained if the mount for the free end of the wiper arm, in the wiping direction is disposed next to or in front of or behind—depending on the direction it is seen from—the wiper blade.

If the device half having the bearing receptacle is made of metal, preferably being shaped from a metal sheet, then it is possible to crimp the wiper arm end in the insertion channel, or in other words to deform the channel without metal cutting, after the wiper arm has been introduced, in order to assure a secure seat.

For fastening both the plastic and the metal device half on the free end of the wiper arm, this end may have at least a certain surface roughness.

Further advantageous refinements and features of the invention are described in the ensuing description of exemplary embodiments shown in the associated drawing.

DESCRIPTION OF THE EXEMPLARY EMBODIMENTS

Figure 1:
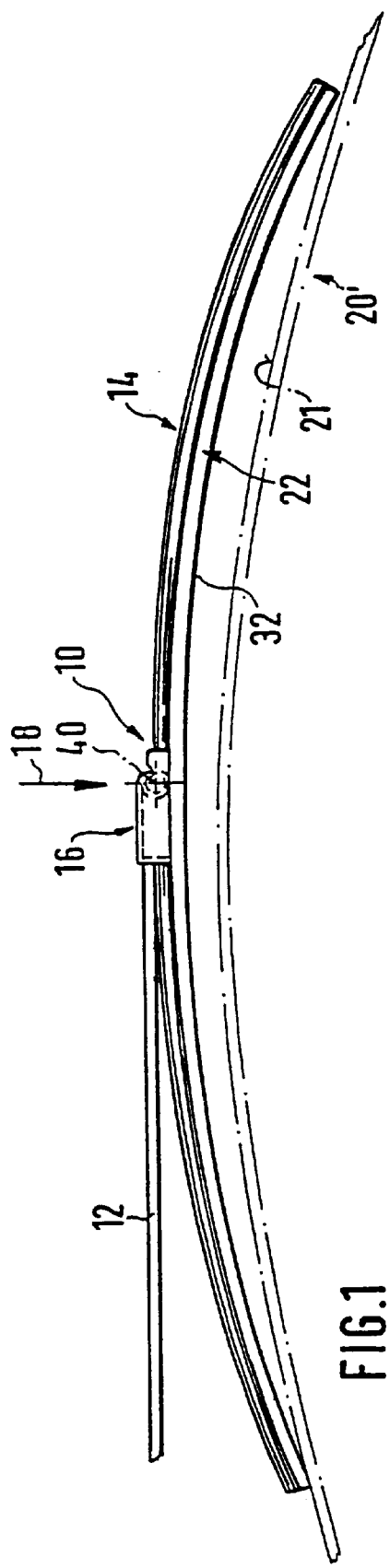
FIG. 1, a side view of a wiping device according to the invention, having a wiper blade and a wiper arm.

A wiping device 10 for motor vehicle windshields, shown in fragmentary form in FIG. 1, includes a driven wiper arm 12 guided on a vehicle body, on the free end of which arm a wiper blade 14 is pivotably connected. The pivotable connection between the wiper arm 12 and the wiper blade 14 is accomplished by a connection device 16. The wiper arm 12 and thus also the wiper blade 14 are stressed in the direction of the arrow 18 toward the window 20 of a motor vehicle, which is suggested by dot-dashed lines in FIG. 1 and on which an elongated, rubber-elastic wiper strip 22 that is part of the wiper blade 14 rests. In this operating position, the wiper blade is displaced over the window in the direction of the double-headed arrow 24 to clean the surface of the window. The wiper blade 14 is shown in FIG. 1, however, in a position in which only its two ends touch the window 20. The wiper strip 22 of the wiper blade 14 is disposed parallel to the longitudinal axis on one strip side, toward the window, of a support element 26. On the other strip side of the support element 26, which faces away from the window, a device part 28 toward the wiper blade and belonging to the connection device 16 is secured to the middle portion of the support element. Another device part 30, toward the wiper arm, is fixedly joined to the free end of the wiper arm 12. As can be seen from FIG. 1, the wiper blade, in its position shown in FIG. 1, in which it is not yet pressed over its entire length against the window 20, is more markedly curved than the window 26. Since the greatest curvature of the window surface is shown in FIG. 1, it is clearly apparent that the curvature of the wiper blade 14, resting with its two ends on the window 20, is greater than the maximum curvature of the window itself. Under the contact pressure (arrow 18), the wiper blade presses with its wiper lip 32 against the window over the entire length of the blade. In the process, a tension builds up in the spring-elastic support element 26 that assures proper contact of the wiper strip or wiper lip, over its entire length, with the window 20. In the present situation, the rear window of motor vehicles can also be considered a windshield, because considerable problems can arise there as well as a consequence of the multilayer turbulence that occurs there. The turbulence between the wiper blade 14 and the wiper arm 12 will be described in further detail below in conjunction with FIGS. 3–8 and 13.

Figure 2:
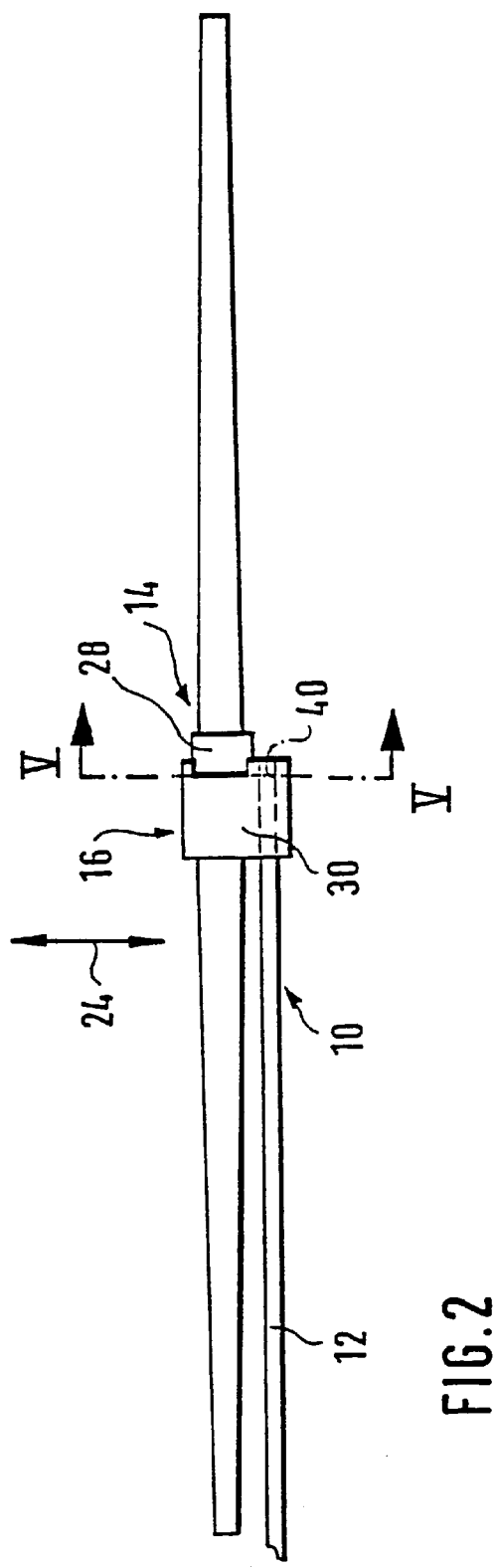
FIG. 2, a top view of the wiping device of FIG. 1.
Figure 3:
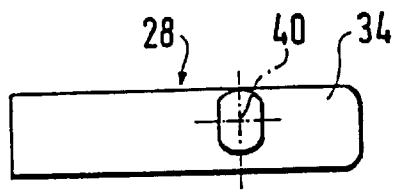
FIG. 3, a side view of one half, the half associated with the wiper blade, of a device, which is part of the wiping device, for connecting the wiper blade to the wiper arm, on a larger scale.
Figure 4:
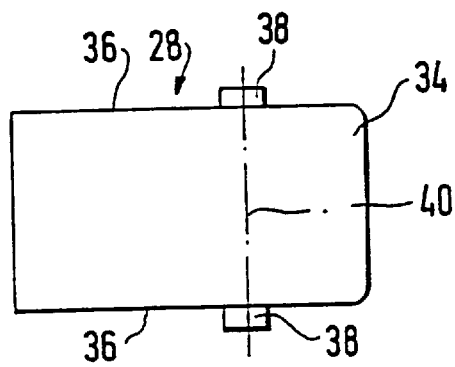
FIG. 4, a top view of the device half of FIG. 3.
Figure 13:
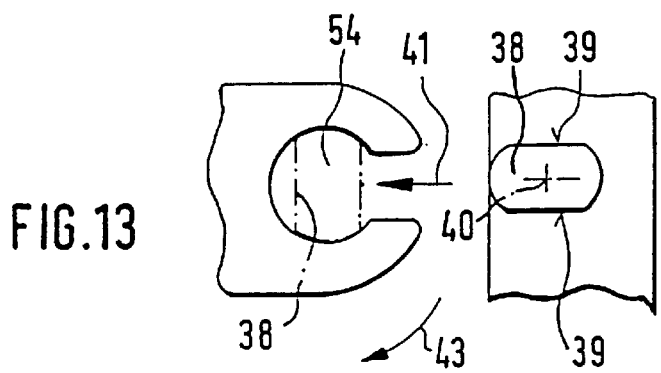
FIG. 13, the disposition of the two device halves of FIGS. 3 and 6, reduced to the pivotable connection, in a position before the wiper blade is connected to the wiper arm.

The first device part 28, toward the wiper blade and shown in FIGS. 3 and 4, has a base body 34, which in the exemplary embodiment is essentially block-shaped. Disposed on each of its two facing side faces 36, which during operation of the wiping device point in the wiping direction (double-headed arrow 24) is a respective projection 38 protruding from the respective side face. The longitudinal axes of the two projections 38 are aligned with one another and form a pivot axis, about which the wiper blade 14 can pivot relative to the wiper arm 12 by a certain angular amount in or counter to the direction of the arrow 43 (FIG. 13). The two projections 38 in a certain sense represent the two free ends of a pivot pin that is integrated with the base body 34. This common longitudinal axis has been assigned reference numeral 40 in FIG. 4. As can be seen particularly from FIG. 2, the longitudinal axis 40 extends essentially in the wiping direction 24.

A first embodiment of the other, second device part 30, toward the wiper arm, is shown in FIGS. 7–10. As FIG. 9 in particular shows, the device part 30 is shaped from a metal sheet. Seen in cross section (FIG. 9), it has a first U-shaped cross section 42 and a second, tubular portion 44 adjoining it. The tubular portion 44 forms a mount and serves as an insertion channel for receiving the free end of the wiper arm 12, which is shown in dot-dashed lines in FIGS. 6 and 9. The necessary firm connection between the wiper arm and the device part 30 can be accomplished in manifold ways. To that end, in the exemplary embodiment, threaded bores 48 are disposed in a wall region 46 of the tubular portion 44 and guide the reception of clamping screws, not shown, that serve to fasten and secure the device part 30 to the end of the wiper arm 12. The other, U-shaped portion 42 of the device part 30 is adapted in such a way to the other device part 28 that its two legs 50 and 52 of the U fit over the side faces 36, remote from one another, of the first device part 28. One bearing receptacle 54, each for one of the projections 38 present on the device part 28, is disposed in each of the two legs 50 and 52 of the U. The embodiment of the bearing receptacles 54 can be seen particularly in FIG. 6. They have a bearing bore 56, which is open at the edge via a slit 58 pointing longitudinally of the wiper arm 12. The width of the slit 56 is somewhat less than the diameter of the bore 56, which is adapted to the diameter of the projection 38 of the first device part 28. The axes of the two bearing bores 56 are aligned with one another, which is documented in FIG. 9 by the dot-dashed line 60.

Figure 11:
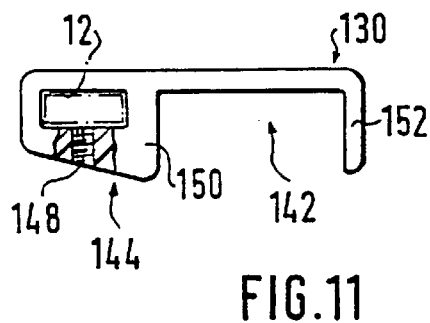
FIG. 11, an elevation view according to FIG. 9 for a differently embodied device half.

Another embodiment of the second device part 130, toward the wiper arm, is shown in FIG. 11. This device part is made from a plastic. In principle, however, it has the same design as the device part 30 shown in FIGS. 7–10. Thus— seen in cross section—it likewise has a U-shaped portion 142 and a substantially tubular portion 144. The tubular portion 144 forms a mount and again serves to receive the free end of the wiper arm 12, which is shown in dot-dashed lines in FIG. 11. At least one threaded bore 148 in the wall of the tubular portion serves to fasten and secure the device part 130 to the free end of the wiper arm 12, with the aid of a clamping screw, not shown. Thus the tubular portion 144 in a sense forms a mount for the device part 130 on the wiper arm 12. Otherwise, the embodiment of the device part 130 is equivalent to the embodiment of the device part 30 shown in FIGS. 7–10. This is true in particular for the disposition of bearing receptacles in the legs 150 and 152 of the U.

Figure 5:
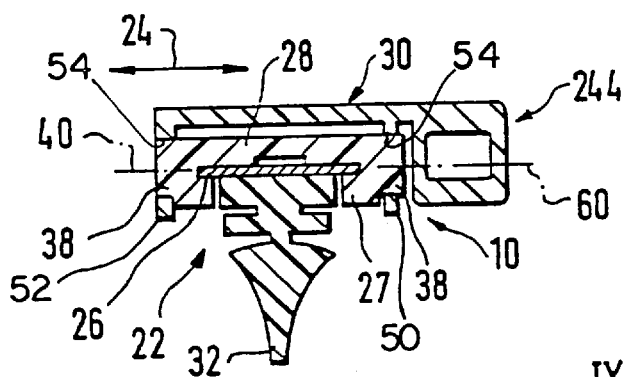
FIG. 5, a section taken along the line V—V through the wiping device of FIG. 3, on a larger scale and rotated by 90°.
Figure 6:
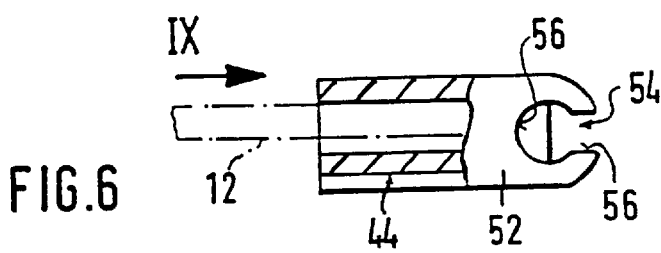
FIG. 6, a side view, partly in section, of the other half, associated with the wiper arm, of the device that is part of the wiping device for connecting the wiper blade to the wiper arm, on a larger scale.
Figure 7:
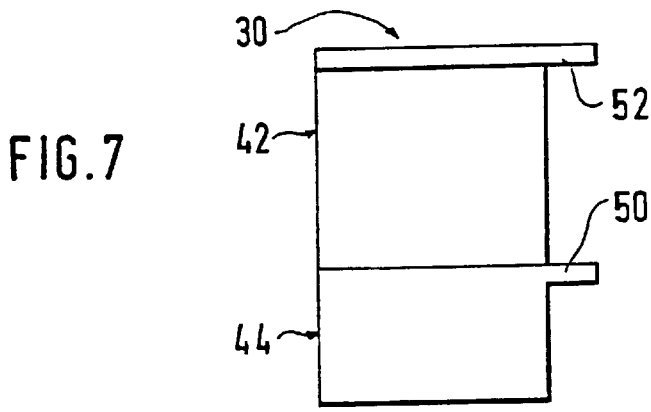
FIG. 7, a view from below of the device half of FIG. 6.
Figure 8:
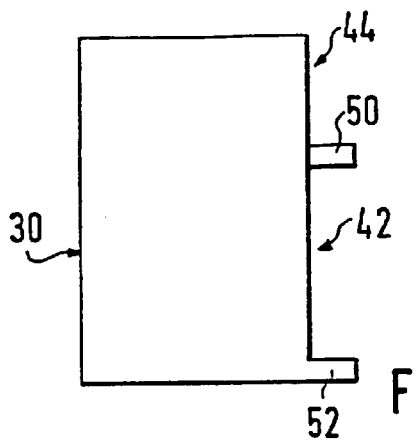
FIG. 8, a top view of the device half of FIG. 6.
Figure 9:
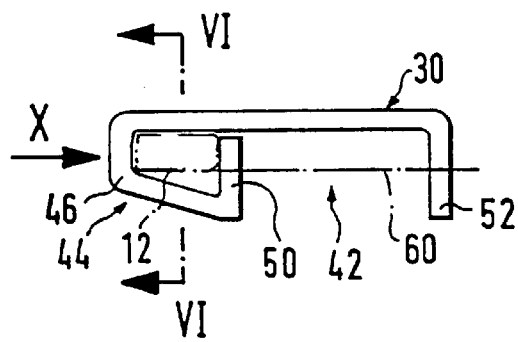
FIG. 9, an elevation view of the device half of FIG. 6, seen in the direction of the arrow IX.
Figure 10:
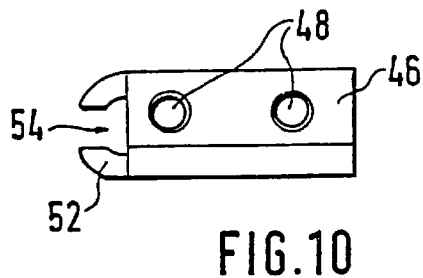
FIG. 10, an elevation view of the device half of FIG. 6, seen in the direction of the arrow X.

The sectional view in FIG. 5 shows a section through the wiping device taken along the line V—V of FIG. 2. However, the tubular portion 244, which can be called a mount for the wiper arm 12, is shown in only a basic design, or in other words without any reference to the embodiments of FIGS. 7 and 9. It can be seen from FIG. 5 that the device part 28, toward the wiper blade, of the wiping device 10 is disposed on the side remote from the window of the striplike, elongated support element 26. In order to obtain proper fastening to the support element, this part merely fits under the support element with hooklike extensions 27. FIG. 5 also shows that the wiper strip 32 is disposed on the bottom side of the support element 26, facing toward the window. It can also be seen clearly from this drawing figure that the pivoting projections 38 of the device part 28 are located in the bearing receptacles 54 of the second device part 30, toward the wiper arm. FIGS. 2, 5, 9 and 11 in particular show unmistakably that the tubular mount 44, 144 or 244, seen in the wiping direction (arrow 24), is located next to the U-shaped portion 42 or 142. In FIG. 5, the entire pivot axis or longitudinal axis 40 crosses through the tubular bearing receptacle 144. When assembled, the longitudinal axis 60 of the bearing receptacles 54 is aligned with the common longitudinal axis of the projections 40. As a result, seen in a top view of the wiping device of FIG. 2, the wiper blade 14 is disposed next to the wiper arm 12 and is pivotably connected to it via the connection device 16 that includes the device parts 28 and 30. The pivotable connection between the wiper arm and the wiper blade is necessary so that the wiper blade can adapt to the spherically but not circularly curved surface of the window in all possible working positions.

Figure 12:
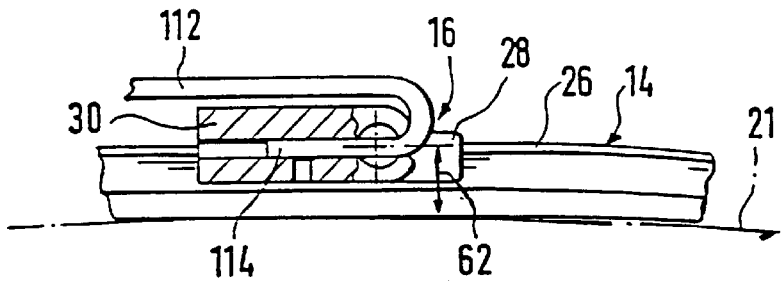
FIG. 12, a fragmentary view, partly in section, of the wiping device in which the free end of the wiper arm is curved in hooklike fashion.

In a departure from the embodiments of FIGS. 1 and 2 of the wiping device 10, it is not absolutely necessary for the free end of the wiper arm to be embodied in stretched-out fashion. It is readily also conceivable to introduce the free hook shank 114 of a so-called hook wiper arm 112 and fix it there. FIG. 12 also shows that when the surface 21 to be wiped of the window, the pivot axis 40, 60 is located in front of the window by a distance 62. It is understood that this also applies to all the embodiments of the invention discussed here.

In conjunction with FIG. 3, the mounting of the wiper blade 14, provided with the device part 28, on the wiper arm 12 provided with the device part 30 will now be described. So that the projections 38 can enter their bearing receptacles 54, they are provided with flattened faces 39 facing one another, the distance between which faces is adapted to the width of the slit 56 in the bearing receptacles 54. While the slit 56 extends approximately parallel to the surface of the window, the flattened faces 39 are oriented in a plane perpendicular to the window. For connecting the wiper blade to the wiper arm, the wiper blade is folded away from the window, and the wiper blade is brought into the position shown in FIG. 13 relative to the wiper arm. After that, the wiper blade is displaced in the direction of the arrow 41, in the course of which the two projections 38 enter their bearing receptacles 54. By rotation of the wiper blade in the direction of the arrow 43, the projections 13 enter the operating position inside the bearing receptacle 54, which position is shown in dot-dashed lines in FIG. 13, in which they cannot be removed from their bearing receptacles 54.

It has thus been unambiguously described that by means of the invention an especially low structural height of the wiping device is made possible, because the wiper arm 12 can be disposed next to the wiper blade in the wiping direction (arrow 24). This can be achieved particularly in a wiper blade of this generic type, which by its design—a separate, striplike, elongated and spring-elastic support element, on whose strip face toward the window the wiper strip is disposed—already makes a relatively low initial structural height possible.

What is claimed is:

1. A wiping device for windshields of motor vehicles, comprising a driven wiper arm having a free end; a wiper blade pivotably connected to said free end of said wiper arm and provided with an elongated, rubber-elastic wiper strip, said wiper blade having a pivot axis extending at least approximately in a wiping direction and spaced apart from the window; a strip like, elongated, spring-elastic support element which holds said wiper strip parallel to a longitudinal axis of said support element; a connection device having one half provided on a middle portion of said support element and another half provided on said free end of said wiper arm, said wiper blade being disposed next to the wiper arm as viewed vertically to the window and is pivotably connected to said wiper arm via said connection device, said one of said halves of said connection device having a pivot pin, while the other of said halves of said connection device is provided with a bearing receptacle associated with said pivot pin, said pivot pin being disposed on said wiper blade, said bearing receptacle being located on said wiper arm.

2. A wiping device as defined in claim 1, wherein said halves of said connection device are provided with means for axially securing said pivot pin in said bearing receptacle.

3. A wiping device as defined in claim 1, wherein said half of said connection device which is provided with said pivot pin has a base body with two sides having projections which protrude in the wiping direction, said projections having longitudinal axes which are aligned with one another.

4. A wiping device as defined in claim 3, wherein said half of said connection device which is provided with said bearing receptacle has a U-shaped cross-section with two legs fitting over the sides of said base body, said bearing receptacle being disposed in each of said two legs for said projections disposed on the sides of said body.

5. A wiping device as defined in claim 3, wherein one of said legs is provided with a mount for the free end of said wiper arm.

6. A wiping device as defined in claim 5, wherein said mount has an insertion channel for the free end of said wiper arm and is provided with means for securing the end of said wiper arm in said insertion channel.

7. A wiping device as defined in claim 6, wherein said mount for said free end of said wiper arm is located next to said wiper blade.

8. A wiping device as defined in claim 1, wherein said half of said connection device which is provided with said bearing receptacle is composed of plastic.

9. A wiping device as defined in claim 1, wherein said half of said connection device which is provided with said bearing receptacle is composed of metal.

10. A wiping device as defined in claim 9, wherein said half of said connection device which is provided with said bearing receptacle is formed from a metal sheet.

* * * * *